United States Patent [19]

St. Clair

[11] Patent Number: 5,486,570
[45] Date of Patent: Jan. 23, 1996

[54] POLYURETHANE SEALANTS AND ADHESIVES CONTAINING SATURATED HYDROCARBON POLYOLS

[75] Inventor: David J. St. Clair, Houston, Tex.

[73] Assignee: Shell Oil Company, Houston, Tex.

[21] Appl. No.: 315,166

[22] Filed: Sep. 29, 1994

[51] Int. Cl.$^6$ .................. C08L 75/00; C08F 8/30
[52] U.S. Cl. .......... 525/123; 525/130; 525/327.3; 525/330.2; 525/331.7; 525/332.8; 525/366; 525/455; 528/59; 528/60; 528/65
[58] Field of Search .................. 525/123, 130, 525/327.3, 330.2, 331.7, 332.8, 366, 455; 528/59, 60, 65

[56] References Cited

U.S. PATENT DOCUMENTS

| | | | |
|---|---|---|---|
| 3,648,748 | 3/1972 | Lovell | 152/357 |
| 3,743,617 | 8/1973 | Kest | 260/27 |
| 3,857,826 | 12/1974 | Greene et al. | 260/88.2 |
| 3,879,248 | 4/1975 | Kest | 156/289 |
| 4,021,391 | 5/1977 | Ijichi et al. | 260/27 |
| 4,039,593 | 8/1977 | Kamienski et al. | 260/635 |
| 4,152,309 | 5/1979 | Ijichi et al. | 260/27 |
| 4,242,468 | 12/1980 | Baack et al. | 521/170 |
| 4,448,947 | 5/1984 | Miyake et al. | 528/44 |
| 4,507,447 | 3/1985 | Yamazaki et al. | 525/440 |
| 4,742,112 | 5/1988 | Brauer et al. | 528/49 |
| 4,812,524 | 3/1989 | Baghdachi | 525/236 |
| 4,866,120 | 9/1989 | Rudnick et al. | 524/849 |
| 4,898,919 | 2/1990 | Ueda et al. | 525/454 |
| 4,906,673 | 3/1990 | Mori et al. | 524/871 |
| 5,115,007 | 5/1992 | Chihara et al. | 524/267 |
| 5,234,996 | 8/1993 | Mori et al. | 525/454 |

FOREIGN PATENT DOCUMENTS

| | | |
|---|---|---|
| 798374 | 2/1966 | Canada. |
| 58-127724 | 7/1983 | Japan. |
| 59113016 | 6/1989 | Japan. |
| 3-273018 | 12/1991 | Japan. |

*Primary Examiner*—John C. Bleutge
*Assistant Examiner*—Randy Gulakowski

[57] ABSTRACT

Polyurethane sealants and adhesives made with saturated, polyhydroxylated polydiene polymers and polyisocyanates have improved tack and peel strength when the crosslinked polyurethane has non-load bearing saturated hydrocarbon segments formed by use of substantially less than stoichiometric amounts of polyisocyanate or by addition of monohydroxylated polydiene polymers.

20 Claims, No Drawings

POLYURETHANE SEALANTS AND ADHESIVES CONTAINING SATURATED HYDROCARBON POLYOLS

FIELD OF THE INVENTION

This invention relates to polyurethane compositions useful as sealants and adhesives, especially adhesives for pressure sensitive or laminating applications.

BACKGROUND OF THE INVENTION

Polyurethane compositions based on the reaction of polyisocyanates with hydroxylated polybutadienes are well known for use as adhesives, sealants, and coatings for metals and plastics. In conventional polyurethane sealants and adhesives, the polyisocyanate and polyhydroxylated polybutadiene are reacted at near stoichiometric ratios of functional groups (NCO:OH). Because polyhydroxylated polybutadiene polymers are unsaturated, polyurethane sealants and adhesives based on them have limited durability. It is known that durability can be improved by using hydrogenated polyhydroxylated polybutadienes. However, polyurethane sealants and adhesives based on saturated, polyhydroxylated polybutadienes generally have poor tack and low peel strength.

It is an object of the present invention to provide polyurethane sealants and adhesives based on saturated, polyhydroxylated polybutadienes with improved tack and peel strength.

SUMMARY OF THE INVENTION

The present invention relates to polyurethane sealants and adhesives, especially pressure sensitive adhesives and laminating adhesives, comprising a polyisocyanate and a saturated, polyhydroxylated polydiene. The sealants and adhesives contain saturated polydiene polymers, some of which are reacted into the network structure through the hydroxyl groups on at least two ends of the polymer molecule, making them load bearing, and some of which are reacted into the network structure through the hydroxyl group on only one end, making them non-load bearing. This is accomplished by 1) reacting saturated polydiene polymers having at least 2 hydroxyl groups with substantially less than stoichiometric quantities (NCO/OH<<1.0) of polyisocyanate or 2) reacting stoichiometric quantities (NCO/OH near 1.0) of polyisocyanate, a saturated, monohydroxylated polydiene, and a saturated, polyhydroxylated polydiene. The sealants and adhesives have significantly improved tack and peel strength in comparison to conventional polyurethane sealants and adhesives.

DETAILED DESCRIPTION OF THE INVENTION

The tack and peel strength of polyurethane sealants and adhesives prepared with polyisocyanates and saturated, polyhydroxylated polydiene polymers are significantly improved by incorporating saturated polydiene polymers which are attached to the network of the crosslinked sealants or adhesive at only one end of the polymer. This is accomplished by reacting a polyisocyanate with a saturated, dihydroxylated polydiene using less than a stoichiometric amount of the isocyanate (NCO/OH<<1) or by reacting a polyisocyanate with a mixture of a saturated, dihydroxylated polybutadiene and a saturated, monohydroxylated polybutadiene using a stoichiometric amount of a polyisocyanate (NCO/OH about 1).

The polyisocyanate used in this invention can be an aliphatic or an aromatic polyisocyanate or a mixture of the two. Aliphatic polyisocyanates are generally preferred since they will give sealants and adhesives having lighter color and better durability than aromatic polyisocyanates. Since the saturated, hydroxylated polydiene usually has a functionality of 1 or 2 hydroxyl groups per molecule, it is necessary that the isocyanate have a functionality of greater than 2 in order to assure that the polyurethane sealant or adhesive composition will crosslink into a cohesive mass. Typically, the polyisocyanate will have a functionality of 3 or more isocyanate (NCO) functional groups per molecule. However, it is possible to use difunctional or monofunctional isocyanates in combination with polyfunctional isocyanates.

Examples of suitable aromatic polyfunctional isocyanates are 1,2,4-benzene triisocyanate, polymethylene polyphenyl isocyanate (Mondur MR ex Miles), the adduct of toluene diisocyanate with trimethylolpropane (Mondur CB-60 ex Miles). Examples of suitable aliphatic polyfunctional isocyanates are the isocyanurate of isophorone diisocyanate (Desmodur Z-4370 ex Miles) and the isocyanurate of hexane diisocyanate (Desmodur N-3390 ex Miles). Desmodur Z-4370 has been found to be a particularly effective triisocyanate for this invention because it has excellent compatibility with the saturated, hydroxylated polydiene polymers of this invention. It gives clear, colorless sealants and adhesives with excellent tack and peel and should also give excellent durability, even under exposure to sunlight.

Although isocyanates having 3 or more NCO groups per molecule will be the major component of the polyisocyanate curing agent, small amounts of diisocyanates and monoisocyanates can also be used. Suitable diisocyanates are toluene diisocyanate, diphenyl methane diisocyanate, isophorone diisocyanate, dicyclohexyl methane diisocyanate and hexane diisocyanate. Suitable monoisocyanates are toluene isocyanate, phenyl isocyanate and cyclohexyl isocyanate.

Polyisocyanate adducts can also be used in this invention. These are typically made by capping a polypropylene oxide diol or triol or a polycaprolactone diol or triol with a diisocyanate.

Blocked polyisocyanates can also be used in this invention in situations in which they can improve processing. Blocked polyisocyanates are the same polyisocyanates discussed above except the NCO groups have been reacted with a molecule which, when heated, will deblock and regenerate the isocyanate functional group. Typical blocking agents are low molecular weight alcohols, such as octyl alcohol. Since the NCO groups are blocked, the isocyanate and the saturated, hydroxylated polydiene polymer can be mixed and applied as a non-reactive sealant or adhesive. After application, the blocked sealant or adhesive is heated to release the blocking agent and regenerate the isocyanate functional group which can then react with the saturated, hydroxylated polydiene and crosslink the sealant or adhesive into a cohesive mass.

The saturated monohydroxylated and polyhydroxylated polydiene polymers are synthesized by anionic polymerization of conjugated diene hydrocarbons, such as butadiene or isoprene, with lithium initiators. The process steps are known as described in U.S. Pat. No. 4,039,593, Re. 27,145, and U.S. patent application Ser. No. 08/160,341, filed Dec. 1, 1993 (TH0259) which descriptions are incorporated herein by reference. Polymerization commences with a monolithium, dilithium, or polylithium initiator which builds a living polymer backbone at each lithium site. Typical monolithium living polymer structures containing conjugated diene hydrocarbons are:

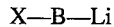

X—B—Li

X—A—B—Li

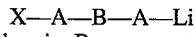

X—A—B—A—Li wherein B represents polymerized units of one or more conjugated diene hydrocarbons such as butadiene or isoprene, A represents polymerized units of one or more vinyl aromatic compounds such as styrene, and X is the functionalized or non-functionalized residue of a monolithium initiator such as sec-butyllithium. B can also be a copolymer of a conjugated diene and a vinyl aromatic compound.

The anionic polymerization is done in solution in an organic solvent, typically a hydrocarbon like hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or glyme (1,2-diethoxyethane) to obtain the desired amount of 1,2-addition. As described in Re 27,145 which is incorporated by reference herein, the level of 1,2-addition of butadiene in the polymer or copolymer can greatly affect viscosity and elastomeric properties after hydrogenation.

The optimum balance between low viscosity and high solubility in a hydrogenated polybutadiene polymer occurs at a 60/40 ratio of 1,4-butadiene/1,2-butadiene. This butadiene microstructure is achieved during polymerization at 50° C. in cyclohexane containing about 6% by volume of diethylether or about 1000 ppm of glyme. This is not a concern when isoprene is the monomer used to make the hydrogenated polydiene polymer and so the polymerization can be done in a pure hydrocarbon solvent with no modifier. The hydrogenated polymers exhibit improved heat stability and weatherability in the final adhesive.

Anionic polymerization is often terminated by addition of water to remove the lithium as lithium hydroxide (LiOH) or by addition of an alcohol (ROH) to remove the lithium as a lithium alkoxide (LiOR). If it is desired to put a terminal hydroxyl group on the end of the polydiene polymer, the living polymer chains must be reacted with a functionalizing agent, preferably ethylene oxide, prior to termination.

The preferred polyhydroxylated polydiene polymer is one having two hydroxyl groups, one on each end of the polymer. This polymer can be made using a di-lithium initiator, such as the compound formed by reaction of two moles of sec-butyllithium with one mole of diisopropylbenzene. This diinitiator is used to polymerize butadiene in a solvent composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired dihydroxy polybutadiene.

The saturated, dihydroxy diene can also be made using a mono-lithium initiator which contains a hydroxyl group which has been blocked as the silyl ether. Details of the polymerization procedure can be found in U.S. patent application Ser. No. 08/160,341, filed Dec. 1, 1993 (TH0259). A suitable initiator is hydroxypropyllithium in which the hydroxyl group is blocked as the tert-butyl-dimethylsilyl ether. This mono-lithium initiator can be used to polymerize isoprene or butadiene in hydrocarbon or polar solvent. The molar ratio of initiator to monomer determines the molecular weight of the polymer. The living polymer is then capped with one mole of ethylene oxide and terminated with one mole of methanol to yield the mono-hydroxy polydiene polymer. The silyl ether is then removed by acid catalyzed cleavage in the presence of water yielding the desired dihydroxy polydiene polymer.

Polyhydroxylated polydiene polymers can be obtained using similar technology. Multifunctional-lithium initiators can be prepared from reaction of sec-butyllithium with diisopropylbenzene at less than a 2:1 molar ratio. These multi-lithium initiators can then be used to polymerize butadiene in solvent. The living polymers would then be capped with ethylene oxide and terminated with methanol to give the polyhydroxylated polydiene polymer. Alternatively, the protected mono-lithium initiator can be used to polymerize butadiene or isoprene. The living polymer can be coupled with a multifunctional coupling agent and the blocking agent would then be removed, regenerating the hydroxyl group. A trifunctional coupling agent like methyltrimethoxysilane would yield a tri-hydroxy polydiene polymer. A tetrafunctional coupling agent like silicone tetrachloride would yield a tetra-hydroxy polydiene polymer. A propagating coupling agent like divinylbenzene would yield a multi-hydroxy polydiene polymer having up to 20 hydroxyl groups per polydiene polymer.

The mono-hydroxylated polydiene polymer of this invention is most preferably made with a mono-lithium initiator, preferably sec-butyllithium. The mono-lithium initiator is used to polymerize isoprene or butadiene in a suitable solvent. The living polymer is capped, preferably with ethylene oxide, and terminated, preferably with methanol, to yield the desired monohydroxyl polydiene polymer.

The hydroxylated polydiene polymers of this invention are hydrogenated such that at least 90%, preferably at least 95%, of the carbon to carbon double bonds in the polyhydroxylated polydiene polymers become saturated. Hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. A particularly preferred catalyst is a mixture of nickel 2-ethylhexanoate and triethylaluminum.

The hydroxylated polydiene polymers for this invention are preferably made using isoprene or butadiene. The polyisoprene polymer can have any microstructure, from nearly all 1,4-isoprene addition to nearly all 3,4-isoprene addition. In order to minimize viscosity, the microstructure should be as high in 1,4-isoprene as possible. Under practical polymerization conditions, 1,4-isoprene contents of about 90% can be readily achieved. The polybutadiene polymer must have no less than about 40% 1,2-butadiene addition because, after hydrogenation, the polymer will be a waxy solid at room temperature if it contained less than about 40% 1,2-butadiene addition. The 1,2-butadiene content can be as high as 100%. However, to minimize viscosity, the 1,2-butadiene content should be between about 40 and 60%. If desired, copolymers of isoprene and butadiene can be used and copolymers with a vinyl aromatic compound, such as styrene, can also be used. These copolymers can be random, tapered or block copolymers. The diene microstructures were determined by $C^{13}$ nuclear magnetic resonance (NMR) in chloroform.

The hydroxlated polydiene polymers of this invention will have hydroxyl equivalent weights between about 500 and about 20,000, preferably between 1000 and 15,000, and most preferably between 2000 and 10,000. Thus, for monohydroxy polydiene polymers, suitable peak molecular weights will be between 500 and 20,000. For di-hydroxy polydiene polymers, suitable peak molecular weights will be between 1000 and 40,000. For tri-hydroxy polydiene polymers, suitable peak molecular weights will be between 1500 and 60,000, and so forth for polydiene polymers having an even greater number of hydroxyl groups per molecule. Below the lower molecular weight range, cost becomes prohibitively high because of the high cost of the polymerization initiator. Above the higher molecular weight range, viscosity becomes somewhat high making mixing and application of the adhesive more difficult and, at such high hydroxyl equivalent weights, it becomes difficult to accomplish the required polyurethane chemistry. The peak molecular weights referred to here are peak molecular weights measured by gel permeation chromatography (GPC) calibrated with polybutadiene standards having known peak molecular weights. The solvent for the GPC analyses is tetrahydrofuran.

The polyhydroxylated polydiene polymers used in this invention have utility in the conventional applications such as in polyurethane coatings as described in U.S. Pat. No. 4,242,468. However, the present invention comprises use of the polyhydroxylated polydiene polymers to make improved sealants, pressure sensitive adhesives, and laminating adhesives having saturated polymer molecules which are attached at only one end to the crosslinked polyurethane network.

In a first embodiment, the sealants or adhesive is comprised of a polyisocyanate having a functionality from about 2.2 to about 10 and a saturated, dihydroxylated polydiene having a peak molecular weight from about 1000 to about 40,000, and the ratio of isocyanate to hydroxyl groups (NCO/OH) is substantially below stoichiometric (from about 0.7:1 to about 0.3:1).

In a second embodiment, the sealant or adhesive is comprised of the same polyisocyanate and the same saturated, dihydroxylated polydiene polymer as in the first embodiment. However, the sealant or adhesive also contains a saturated, monohydroxylated polydiene polymer and the ratio of NCO:OH functionality is near stoichiometric (from 0.9:1 to about 1.1:1). The ratio of monohydroxylated polydiene to dihydroxylated polydiene ranges from about 85:15 to about 25:75.

The essential components of the sealants and adhesives of this invention are the polyisocyanate and the saturated, hydroxylated polydiene polymers. However, the sealants and adhesives can contain many other ingredients as follows.

Aromatic polyisocyanate curing agents are usually sufficiently reactive that they will cure the polyhydroxylated polymer readily at ambient temperature without the need for a catalyst. However, aliphatic polyisocyanates are known to be less reactive and so a catalyst is often added to the sealant or adhesive formulation to increase the rate of reaction. Many catalysts are known in the literature to enhance isocyanate/hydroxyl reactions. A particularly preferred catalyst is dibutyl tin dilaurate (DABCO® T-12 from Air Products). Catalysts are used at concentrations of about 0.05 to about 0.5% w.

The examples will show that adhesives having a good balance of tack, adhesion and holding power can be made using only the polyisocyanate and the saturated, hydroxylated polydiene polymers. However, the examples will also show that holding power can be improved by reinforcing the polyurethane adhesive with a low molecular weight diol. Suitable reinforcing diols are also well known in the polyurethane literature such as ethylene glycol, propylene glycol, butane diol, hexane diol and the like. A particularly preferred reinforcing diol is 2-ethyl1,3-hexane diol (PEP-Diol) because of its particularly good compatibility with the adhesives of this invention.

The materials of the present invention offer a sealant or adhesive formulator wide latitude to combine a variety of ingredients together with the polymers of the present invention in order to obtain products having the proper combination of properties (such as adhesion, cohesion, durability, low cost, etc.) for particular applications (including pressure sensitive adhesives, contact adhesives, laminating adhesives, assembly adhesives, building sealants and caulks, automotive sealants, can sealants, etc). Thus, a suitable formulation might contain only the polymers of the present invention and the curing agent. However, in many sealant or adhesive applications, suitable formulations would also contain various combinations of resins, plasticizers, fillers, solvents, stabilizers and other ingredients such as asphalt. The following are some typical examples of formulating ingredients for adhesives, as well as sealants.

In some formulations, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from 0 to 400 parts by weight per hundred parts rubber (phr), preferably between 0 to 300 phr, most preferably 0 to 150 phr. The selection of the particular tackifying agent is, in large part, dependent upon the specific polymer employed in the respective composition.

The polyurethane compositions are well suited for making sealants which usually perform the function of adhesives and must maintain adhesion between two surfaces. In building construction, the two surfaces are often wood to wood, glass to wood, glass to metal, etc. For automotive sealants, the surfaces are often metal to metalm metal to glass, metal to plastic, etc. The sealant must maintain cohesion as the two surfaces move slightly relative to each other. Adhesion and cohesion are closely related. Excess adhesion can result in cohesive failure, while excess cohesion can result in adhesive failure.

A composition of the instant invention may contain plasticizers, such as oils used in conventional rubber compounds. Rubber compounding oils are well-known in the art and include both high saturates content oils and high aromatics content oils. Preferred plasticizers are highly saturated oils (like Tufflo® 6056 and 6204 oil made by Arco) and process oils (like Shellflex® 371 oil made by Shell). The amounts of rubber compounding oil employed in the invention composition can vary from 0 to about 500 phr, preferably between about 0 to about 100 phr, and most preferably between about 0 and about 60 phr.

A wide variety of fillers can be used in formulations with the present invention. Suitable fillers include calcium carbonate, clays, talcs, zinc oxide, titanium dioxide, silica and the like. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfer with the reaction between the polyisocyanate and the saturated, polyhydroxylated polydiene polymer.

Stabilizers known in the art may also be incorporated into the composition. These may be for protection during the life of the sealant or adhesive against, for example, oxygen, ozone and ultra-violet radiation. These may also be for stabilization against thermo-oxidative degradation during elevated temperature processing. Antioxidants and UV inhibitors which interfere with the urethane curing reaction must be avoided. Preferred antioxidants are the sterically hindered phenolic compounds like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. If the adhesive will be mixed at high temperature or if the product must survive many years in service, stabilizer concentration could be as much as about 10 phr.

If the sealant or adhesive will be applied from solvent solution, the formulation will be dissolved in a solvent or blend of solvents to control viscosity. Preferred solvents are aliphatic and aromatic hydrocarbon solvents. Suitable aliphatic solvents are hexane, naphtha or mineral spirits. Suitable aromatic solvents are toluene and xylene. Oxygenated solvents may also be used, such as ethers, esters and ketones but alcohols must be avoided since they will interfer with the reaction of the polyisocyanate and the saturated, hydroxylated polydiene polymer. The solvents must be urethane grade, low water content solvents. The amount of solvent in the formulation will depend on the viscosity requirements and on the particular polymers in the formulation. Generally, however, if the adhesive will be formulated with a blocked isocyanate and will be mixed and applied at elevated temperature, it may be possible that no solvent would be needed in the formulation. However, if the adhesive will be sprayed at room temperature as a two-component product, solvent could be as much as about 50% w of the formulation.

The saturated, hydroxylated polydiene polymers of the present invention may also be blended with other polymers to improve certain properties such as specific adhesion. Such polymers are generally condensation polymers including polyamides, polyurethanes, polyacrylates, polymethacrylates, vinyl ester polymers, polysulfones, polycarbonates and polyesters, including those, like polylactones, which have a recurring ester linkage in the molecule, and those, like polyalkylene arylates, including polyalkylene terephthalates, having a structure formed by polycondensation of a dicarboxylic acid with a glycol.

DETAILED DESCRIPTION OF THE PREFERRED EMBODIMENTS

In the most preferred embodiments, a pressure sensitive adhesive or laminating adhesive is produced when a polyisocyanate having a functionality of about 3 is reacted with a mixture of a saturated, dihydroxylated polydiene having a number average molecular weight from 4000 to 20,000 and a saturated, monohydroxylated polybutadiene having a number average molecular weight from 2000 to 10,000. The ratio of NCO:OH functionality is near stoichiometric (from 0.9:1 to about 1.1:1) and the ratio of monohydroxylated polybutadiene to dihydroxylated polybutadiene ranges from 75:25 to 50:50.

All polyurethane compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive or sealant application.

The preffered adhesive compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

The adhesive compositions of the present invention may be utilized as laminating adhesives, pressure sensitive adhesives, tie layers, hot melt adhesives, solvent borne adhesives and waterborne adhesives in which the water has been removed before curing. The adhesive can consist of simply the crosslinked polymer or, more commonly, a formulated composition containing a significant portion of the polymer along with other known adhesive composition components.

The adhesive compositions of the present invention are particularly well suited for use as laminated adhesives, especially when laminating films of polar polymers or foils to films of polyolefins, such as polyethylene or polypropylene. Laminating adhesives are used to bond dissimilar films together in order to make laminates which have properties better than either of the films alone. Examples of laminates used in food packaging are PVDC coated polyester film laminated to polyethylene film and aluminum foil laminated to polypropylene film. Typically, the laminating adhesive is applied to one of the films, the coated film is heated if necessary to evaporate any solvent or water in the adhesive, and the second film is laminated to the adhesive. A satisfactory laminating adhesive will give the laminate enough integrity to be handled initially. The ultimate bond strength may take up to a week to develop and is usually strong enough that the films will tear before the adhesive fails.

The adhesive compositions of the present invention are also particularly well suited for use as pressure sensitive adhesives (PSA's). PSA's are adhesives which give an instantaneous bond to a substrate upon application with mild pressure. PSA's are used in a tremendous variety of applications, ranging from tapes for packaging and masking, to labels for marking and decoration, to health care products such as disposable diapers and fasteners for medical devices. The adhesives, in solvent, in water or as a hot melt, are usually applied onto a paper or film backing. The adhesive is heated if necessary to evaporate any solvent or water. It is then self-wound onto the release coated backing as a tape, or it is laminated to a sheet of release paper and die-cut as a label.

In the following examples, all adhesives were mixed at about 60% w solids content in dry toluene. The adhesives were applied onto 0.001 inch thick polyester film using a doctor blade and dried/cured for at least 7 days at 25° C. Film thickness of the dry adhesives was about 0.001 inch. Test methods were usually Pressure Sensitive Tape Council (PSTC) or American Society for Testing Materials (ASTM) standard procedures. Rolling Ball Tack is the distance (centimeters) a steel ball having a standard initial velocity rolls on the adhesive film (PSTC test No. 6). Polyken Probe Tack is the force (grams) required to withdraw a steel probe from contact with the adhesive (ASTM D-2979). 180° Peel is the force (pounds per inch of width) required to peel the adhesive from a steel panel (PSTC test No. 1). Holding Power to Steel or Kraft is the time (minutes) required to pull a standard area (1×1 inch) of tape from a standard test surface (steel or kraft paper) under a standard load (1 kilogram) in shear (PSTC test No. 7). The SAFT to Mylar was measured by a 1×1 inch Mylar to Mylar lap joint with a 1 kilogram weight. The SAFT to Kraft was measured by a 1×1 inch Mylar to kraft paper lap joint with a 1 kilogram weight. SAFT measures the temperature at which the lap shear assembly fails under load in an oven whose temperature is raised at a rate of 22° C. per hour. The letter C by a test result means that the failure mechanism was cohesive splitting of the adhesive mass itself. The letter A by a test result means adhesive failure at the interface between the adhesive and the substrate.

The present invention is further described by the following examples which include the best mode known to Applicant for making adhesives or sealants with saturated, polyhydroxylated polydienes. The examples are not intended to limit the present invention to specific embodiments although each example may support a separate claim which Applicant asserts to be a patentable invention.

EXAMPLE 1

A linear, hydrogenated butadiene diol polymer having about two terminal hydroxyl groups per molecule, a peak molecular weight of 4000, and a 1,2-addition of 43%, was obtained from Shell Chemical labelled HPVM 2201. This polymer is a fairly thick liquid at 25° C. but flows readily at slightly elevated temperatures (20 poise viscosity at 60° C.).

This hydrogenated polybutadiene diol was used in three polyurethane pressure adhesives wherein the NCO/OH ratio varied from 0.35 to 0.65. The properties of these adhesives are shown in Table 1.

TABLE 1

|  | 1A | 1B | 1C |
|---|---|---|---|
| Component, % w |  |  |  |
| HPVM 2201 Diol | 41.7 | 41.2 | 40.7 |
| DESMODUR Z-4370 | 2.8 | 4.0 | 5.1 |
| DABCO T-12 | 0.003 | 0.004 | 0.005 |
| Xylene | 55.5 | 54.9 | 54.2 |
| NCO/OH | 0.35 | 0.5 | 0.65 |
| Properties |  |  |  |
| Rolling Ball Tack, cm | — | 3 | 10 |
| Polyken Probe Tack, gm | — | 570 | 230 |
| 180° Peel, pli | — | 1.3 C | <0.1 A |
| Holding Power, min |  |  |  |
| to Steel, 1 × 1", 2 kg | — | <1 C | >2900 |
| to Kraft, 1 × 1", 2 kg | — | <1 C | <1 A |
| SAFT, °C. |  |  |  |
| to Mylar, 1 × 1", 1 kg | — | 28 C | 110 C |
| to Kraft, 1 × 1", 1 kg | — | 24 A | 24 A |

No properties were measured on 1A because it was gooey and too low in crosslink density to be a useful adhesive. This example shows that the best NCO/OH ratio for HPVM 2201 in this polyurethane PSA is near 0.6:1 NCO:OH.

EXAMPLE 2

A linear, hydrogenated butadiene diol polymer having about two terminal hydroxyl groups per molecule, a peak molecular weight of about 2000, and 1,2-addition of about 85%, was obtained from Mitsubishi which uses the trademark POLYTAIL HA. This polymer is a fairly thick liquid at 25° C. but flows readily at elevated temperatures (40 poise viscosity at 60° C.).

This hydrogenated polybutadiene diol was used in three polyurethane pressure adhesives wherein the NCO/OH ratio varied from 0.35 to 0.65. The properties are shown in Table 2.

TABLE 2

|  | 2A | 2B | 2C |
|---|---|---|---|
| Component, % w |  |  |  |
| POLYTAIL HA Diol | 40.6 | 39.7 | 38.9 |
| DESMODUR Z-4370 | 5.2 | 7.3 | 9.2 |
| DABCO T-12 | 0.005 | 0.007 | 0.009 |
| Xylene | 54.2 | 53.0 | 51.9 |
| NCO/OH | 0.35 | 0.5 | 0.65 |
| Properties |  |  |  |
| Rolling Ball Tack, cm | 2 | 6 | 31 |
| Polyken Probe Tack, gm | 800 | 400 | 290 |
| 180° Peel, pli | 2.2 C | 2.9 A | 1.1 A |
| Holding Power, min |  |  |  |
| to Steel, 1 × 1", 2 kg | 1 C | >2900 | >1400 |
| to Kraft, 1 × 1", 2 kg | <1 C | 5 A | 20 A |
| SAFT, °C. |  |  |  |
| to Mylar, 1 × 1", 1 kg | 28 | 72 | 74 |
| to Kraft, 1 × 1", 1 kg | 24 | 46 | 37 |

The results show that the best NCO:OH ratio for POLYTAIL HA in this polyurethane PSA is about 0.45:1NCO:OH.

EXAMPLE 3

The results of Example 1 suggested the need for further refinement of the NCO:OH ratio to prepare improved pressure sensitive adhesives. Therefore, the formulations shown in Table 3 were prepared and tested.

TABLE 3

| | 3A | 3B | 3C |
|---|---|---|---|
| Component, % w | | | |
| HPVM 2201 Diol | 41.2 | 41.0 | 40.8 |
| DESMODUR Z-4370 | 4.0 | 4.3 | 4.7 |
| DABCO T-12 | 0.004 | 0.004 | 0.005 |
| Xylene | 54.9 | 54.7 | 54.5 |
| NCO/OH | 0.5 | 0.55 | 0.6 |
| Properties | | | |
| Rolling Ball Tack, cm | 2.5 | 3.5 | 4.7 |
| Polyken Probe Tack, gm | 530 | 520 | 490 |
| 180° Peel, pli | 2.5 C | 0.7 A | 0.7 A |
| Holding Power, min | | | |
| to Steel, 1 × 1", 2 kg | 2 C | 5 C | 1500 A |
| to Kraft, 1 × 1", 2 kg | 1 C | 2 C | 3000 A |
| SAFT, °C. | | | |
| to Mylar, 1 × 1", 1 kg | 31 C | 39 C | 83 C |
| to Kraft, 1 × 1", 1 kg | 28 A | 33 A | 65 A |

These results continue to show that the best NCO:OH ratio for HPVM 2201 in this polyurethane PSA is about 0.6:1 NCO:OH.

EXAMPLE 4

The results of Examples 1 and 3 were used to prepare improved pressure sensative adhesives by addition of 2-ethyl-1,3-hexane diol (PEP-diol) as shown in Table 4.

TABLE 4

| | 4A | 4B | 4C |
|---|---|---|---|
| Component, % w | | | |
| HPVM 2201 Diol | 36.3 | 29.3 | 21.6 |
| PEP-Diol | 0.3 | 0.8 | 1.2 |
| DESMODUR Z-4370 | 4.3 | 4.7 | 5.2 |
| DABCO T-12 | 0.004 | 0.005 | 0.005 |
| Xylene | 59.1 | 65.2 | 72.0 |
| NCO/OH | 0.5 | 0.5 | 0.5 |
| Properties | | | |
| Rolling Ball Tack, cm | 3.5 | 8 | 25 |
| Polyken Probe Tack, gm | 620 | 520 | 280 |
| 180° Peel, pli | 2.3 C | 0.8 A | 0.3 A |
| Holding Power, min | | | |
| to Steel, 1 × 1", 2 kg | 3 C | 26 C | >5000 |
| to Kraft, 1 × 1", 2 kg | .5 C | 3 C | 600 A |
| SAFT, °C. | | | |
| to Mylar, 1 × 1", 1 kg | 35 A | 45 C | >168 |
| to Kraft, 1 × 1", 1 kg | 28 A | 35 A | 45 A |

Results of these experiments demonstrate that PEP-Diol is effective in reinforcing the polyurethane PSA since it changes the failure mechanism in the peel test from cohesive failure to adhesive failure and it increases holding power and SAFT.

EXAMPLE 5

A linear, hydrogenated polybutadiene mono-ol polymer having a hydroxyl group on only one end of the molecule, a peak molecular weight of 3000, and a 1,2-addition of 43% was obtained from Shell Chemical labelled HPVM 1201. This polymer is a fairly thick liquid at 25° C. but flows readily at elevated temperatures (12 poise viscosity at 60° C.).

Pressure sensitive adhesives were prepared from the diol of Example 1, HPVM2201, and this monol, HPVM 1201, wherein the NCO:OH ratio was maintained at 1:1 and the monol:diol ratio was varied as shown in Table 5.

TABLE 5

| | 5A | 5B | 5C | 5D |
|---|---|---|---|---|
| Component, % w | | | | |
| HPVM 2201 Diol | 39.7 | 26.8 | 13.6 | — |
| HPVM 1201 Monol | 13.2 | 26.8 | 40.7 | 54.9 |
| DESMODUR Z-4370 | 10.0 | 9.1 | 8.2 | 7.3 |
| DABCO T-12 | 0.010 | 0.009 | 0.008 | 0.007 |
| Xylene | 37.0 | 37.3 | 37.5 | 37.8 |
| Monol:Diol | 25:75 | 50:50 | 75:25 | 100:0 |
| Properties | | | | |
| Rolling Ball Tack, cm | 19 | 13 | 2.6 | 3.8 |
| Polyken Probe Tack, gm | 80 | 130 | 820 | 330 |
| 180° Peel, pli | <0.1 A | 0.3 A | 1.7 C. | 0.3 C. |
| Holding Power, min | | | | |
| to Steel, 1 × 1", 2 kg | >4000 | 2000 | 5 | 1 |
| SAFT, °C. | | | | |
| to Mylar, 1 × 1", 1 kg | — | >94 | 25 | 25 |

Results of these experiments show the best balance of PSA properties is found at monol:diol ratios of between 75:25 and 50:50.

EXAMPLE 6

Tackifying resin, REGALREZ 1085, was added to the pressure sensitive adhesive compositions of Example 5 as shown in Table 6 (20% tackifying resin) and Table 7 (40% tackifying resin).

TABLE 6

| | 6A | 6B | 6C | 6D |
|---|---|---|---|---|
| Component, % w | | | | |
| HPVM 2201 Diol | 31.8 | 21.4 | 10.8 | — |
| HPVM 1201 Monol | 10.6 | 21.4 | 32.5 | 43.9 |
| DESMODUR Z-4370 | 8.0 | 7.3 | 6.6 | 5.8 |
| REGALREZ 1085 | 12.0 | 12.0 | 12.0 | 12.0 |
| DABCO T-12 | 0.008 | 0.007 | 0.007 | 0.006 |
| Xylene | 37.6 | 37.8 | 38.0 | 38.2 |
| Monol:Diol | 25:75 | 50:50 | 75:25 | 100:0 |
| Properties | | | | |
| Rolling Ball Tack, cm | 3.4 | 3.1 | 3.3 | 1.5 |
| Polyken Probe Tack, gm | 220 | 330 | 1020 | 390 |
| 180° Peel, pli | 0.3 A | 1.0 A | 2.1 C | 0.3 C |
| Holding Power, min | | | | |
| to Steel, 1 × 1", 2 kg | >4000 | >4000 | 4 | 1 |
| SAFT, °C. | | | | |
| to Mylar, 1 × 1", 1 kg | >105 | >100 | 25 | 25 |

TABLE 7

| | 7A | 7B | 7C |
|---|---|---|---|
| Component, % w | | | |
| HPVM 2201 Diol | 23.8 | 16.1 | 8.1 |
| HPVM 1201 Monol | 7.9 | 16.1 | 24.9 |
| DESMODUR Z-4370 | 6.0 | 5.5 | 4.9 |

TABLE 7-continued

|  | 7A | 7B | 7C |
|---|---|---|---|
| REGALREZ 1085 | 24.0 | 24.0 | 24.0 |
| DABCO T-12 | 0.006 | 0.005 | 0.005 |
| Xylene | 38.2 | 38.4 | 38.5 |
| Monol:Diol | 25:75 | 50:50 | 75:25 |
| Properties |  |  |  |
| Rolling Ball Tack, cm | 6.2 | 2.9 | 2.6 |
| Polyken Probe Tack, gm | 300 | 670 | 1230 |
| 180° Peel, pli | 1.4 A | 1.9 A | 2.6 C |
| Holding Power, min |  |  |  |
| to Steel, 1 × 1", 2 kg | >4000 | 2000 | 5 |
| SAFT, °C. |  |  |  |
| to Mylar, 1 × 1", 1 kg | 95 | 90 | 25 |

Results of these experiments show the very beneficial effect of addition of tackifying resin in increasing tack but also the detrimental effect in reducing holding power and SAFT. The optimum amount of tackifier will be determined by the requirements of the particular application for which the adhesive is intended. However, the optimum PSA properties continue to be found at monol:diol ratios of between 75:25 and 50:50.

I claim:

1. A polyurethane composition comprising a polyisocyanate having a functionality of from 2.2 to 10 and a saturated, polyhydroxylated polydiene polymer having a hydroxyl equivalent weight of from 500 to 20,000 wherein the NCO:OH ratio is between 0.3:1 and 0.7:1.

2. The composition of claim 1, further comprising from 0.01 to 1 parts per hundred of polyurethane rubber (phr) of a polyurethane reaction catalyst.

3. The composition of claim 1, further comprising from 20 to 400 phr of a tackifying resin.

4. The composition of claim 1, wherein the polyisocyanate has a functionality of about 3.

5. The composition of claim 1, wherein the polyurethane composition is a pressure sensitive adhesive.

6. The composition of claim 1, wherein the polyurethane composition is a laminating adhesive.

7. A polyurethane composition comprising a polyisocyanate having a functionality of from 2.2 to 10, a saturated polyhydroxylated polydiene having a hydroxyl equivalent weight from 500 to 20,000, and a saturated monohydroxylated polydiene having a hydroxyl equivalent weight from 500 to 20,000, wherein the NCO:OH ratio is from 0.9:1 to 1.1:1 and wherein the ratio of saturated, monohydroxylated polydiene to saturated, polyhydroxylated polydiene is from 85:15 to 25:75.

8. The composition of claim 7, further comprising from 0.01 to 1 phr of polyurethane reaction catalyst.

9. The composition of claim 7, further comprising from 20 to 400 phr of tackifying resin.

10. The composition of claim 7, wherein the polyisocyanate has a functionality of about 3.

11. The composition of claim 7, wherein the polyurethane composition is a pressure sensitive adhesive.

12. The composition of claim 7, wherein the polyurethane composition is a laminating adhesive.

13. A polyurethane adhesive composition comprising a polyisocyanate having a functionality of from 2.2 to 10, a saturated dihydroxylated polydiene having a peak molecular weight from 1,000 to 40,000, and a saturated monohydroxylated polydiene having a peak molecular weight from 500 to 20,000, wherein the NCO:OH ratio is from 0.9:1 to 1.1:1 and wherein the ratio of saturated, monohydroxylated polydiene to saturated, dihydroxylated polydiene is from 85:15 to 25:75.

14. The composition of claim 13, further comprising from 0.01 to 1 phr of polyurethane reaction catalysts.

15. The composition of claim 13, further comprising from 20 to 400 phr of tackifying resin.

16. The composition of claim 13, wherein the polyisocyanate has a functionality of about 3.

17. The composition of claim 16, wherein the polyisocyanate is the isocyanurate of isophorone diisocyanate, the saturated, dihydroxylated polydiene has a peak molecular weight from 4,000 to 20,000, and the saturated, monohydroxylated polydiene has a peak molecular weight from 2,000 to 10,000.

18. The composition of claim 17, wherein the ratio of saturated, monohydroxylated polydiene to saturated, dihydroxylated polydiene is from 75:25 to 50:50.

19. The composition of claim 13, wherein the polyurethane adhesive is a pressure sensitive adhesive.

20. The composition of claim 13, wherein the polyurethane adhesive is a laminating adhesive.

* * * * *